United States Patent [19]
Cahill

[11] 3,902,370
[45] Sept. 2, 1975

[54] SAMPLE COLLECTOR
[76] Inventor: John A. Cahill, Caixaposial 966 ZC00, Rio de Janeiro, Brazil
[22] Filed: July 5, 1974
[21] Appl. No.: 486,072

[52] U.S. Cl. .................................. 73/421 R; 193/39
[51] Int. Cl. ............................................. G01n 1/20
[58] Field of Search .................. 73/421 R; 193/1, 39

[56] References Cited
UNITED STATES PATENTS
3,487,427   12/1969   Cahill ............................... 73/421 R Primary Examiner—S. Clement Swisher

[57] ABSTRACT

A novel and improved open-top sample collector which is especially adapted for placement on, and removal from, a horizontal or inclined moving endless belt; and incorporates means which very effectively cause it to refrain from undesirable relative movement with respect to the moving endless belt conveyor at all times including those when the endless belt conveyor and the sample collector are moving beneath and receiving particulate material which is freely falling from above.

3 Claims, 1 Drawing Figure

PATENTED SEP 2 1975 3,902,370
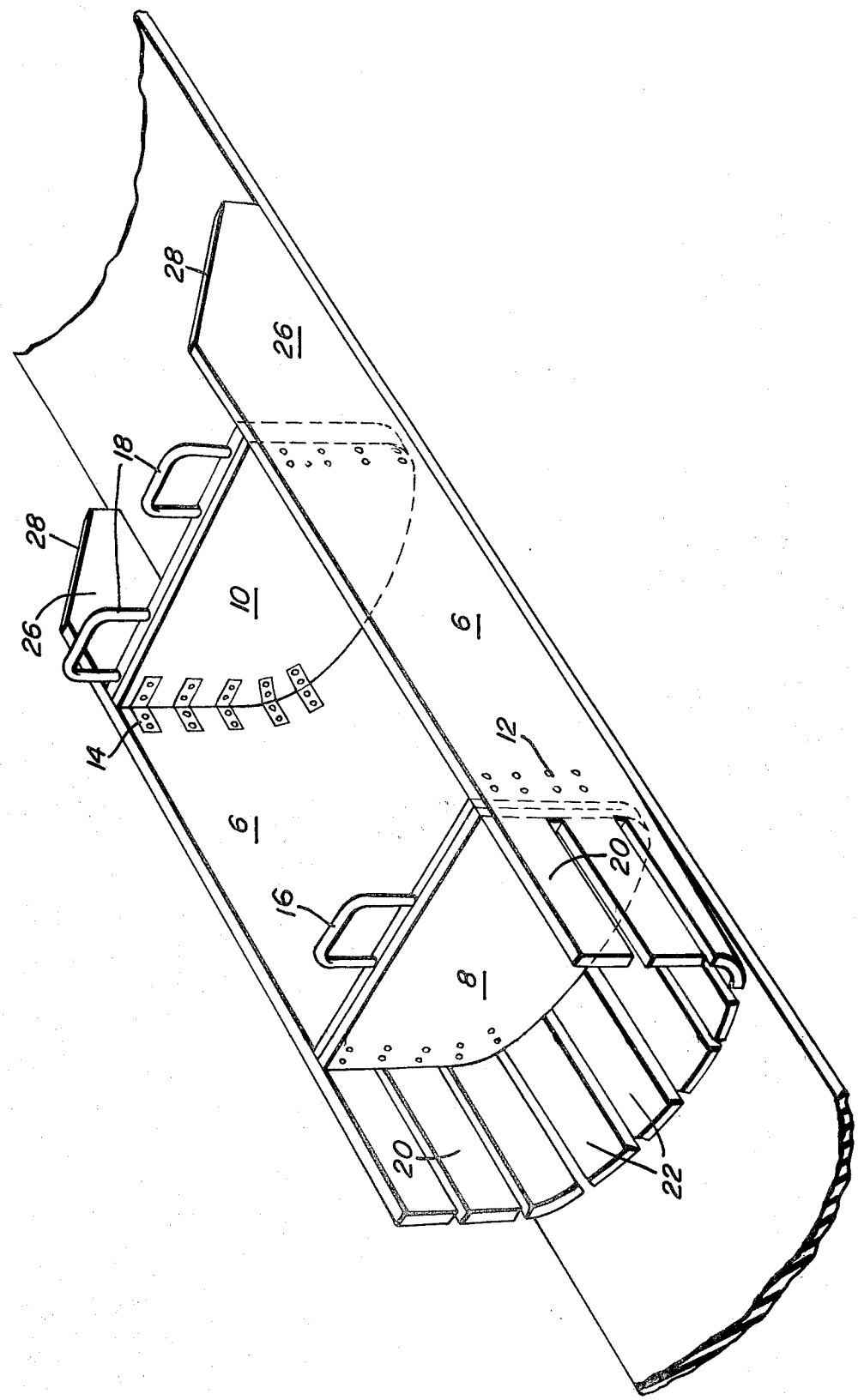

SAMPLE COLLECTOR

BACKGROUND OF THE INVENTION

As pointed out in the preamble to my U.S. Pat. No. 3,487,427, issued Dec. 30, 1969, although many methods and apparatus have, in the past, been proposed for removing samples of particulate material from a moving endless belt conveyor, all of those which were known to me prior to the invention covered thereby were characterized either by tendency to undesirably agitate the particulate material within the sample collector or by requiring the use of apparatus which is very expensive to install, operate and maintain.

In order to maintain samples which are truly representative of the mass of particulate material which is in motion, and as it is in motion, my aforementioned U.S. Pat. No. 3,487,427 provides for moving the material onto a subjacent endless belt conveyor in the form of a freely falling stream and at a point which is proximate to, but spaced from, the upstream extremity of the endless belt conveyor;

disposing on an unloaded upstream portion of the endless belt conveyor an open-top sample collector which extends transversely of the endless belt conveyor and is of sufficient width to collect a true sample of the aforementioned stream of particulate material as it would be had it fallen directly onto the endless belt conveyor; and removing the sample collector from the endless belt conveyor after it has been loaded with the particulate material.

In U.S. Pat. No. 3,659,460, issued May 2, 1972, a particular system is disclosed for removing loaded sample collectors which have been filled in the manner aforesaid from the moving endless belt conveyor, the same comprising an overhead trackway extending at a substantially normal angle to the endless belt conveyor and disposed downstream with respect to the means for delivering the freely falling particulate material onto the endless belt conveyor;

a carriage adapted for movement along said overhead trackway;

a second overhead trackway supported by said carriage and extending downwardly toward the endless belt conveyor and in a direction which is upstream with respect thereto;

a second carriage supported by and adapted for movement along said second overhead trackway; and means on said sample collector for permitting its attachment to said second carriage;

whereby said sample collector may be moved with said second carriage upwardly from and downstream with respect to the moving endless belt conveyor and then transversely thereof by the movement of said first-named carriage along said first-named overhead trackway.

The sample collector of the present invention is particularly well-adapted for cooperation with the apparatus disclosed and claimed in U.S. Pat. Nos. 3,487,427 and 3,659,460, but its use is by no means limited thereto.

It is among the objects of the present invention to provide an improved sample collector of the type referred to hereinbefore which is highly efficient for its intended purpose, including the facility for collecting truly representative samples of particulate materials, such as ores and the like and which, at the same time, has a strong tendency for resisting accidental displacement from its intended position on the endless belt conveyor due to movement thereon and thereinto of the particulate material which is falling onto the endless belt conveyor. The above accidental displacement includes the tendency of the sample collector to hesitate upon entering the falling stream of particulate matter, a hesitation which can distort the representativeness of the sample.

Another object is the attainment of the foregoing objectives and advantages by a sample collector which is inexpensive to manufacture and very durable in service.

The foregoing and further objects and advantages will become more apparent after referring to the following description to be read in conjunction with the annexed drawing wherein like reference numerals designate like parts.

Referring more particularly to the drawing, the number 2 generally designates the sample collector of the present invention which is generally rectangular in plan, and both side and end elevation.

The size and relative dimensions of the sample collector 2 are not critical, and will vary depending upon a number of factors, such as the type of particulate material to be sampled and analyzed, the width and linear speed of the endless belt conveyor etc.

As shown in the drawing, the generally rectangular open-top sample collector 2 comprises a bottom 4, a pair of parallel side walls 6, and a pair of parallel and more distantly spaced end members 8 and 10, said end members having their side edges secured to the adjacent portions of the inner surfaces of the side walls 6 by rivets 12 or the like.

In addition, L-shaped braces 14 are provided for connecting the end members 8 and 10 with the bottom 4 and side walls 6.

The upper flight of endless belt conveyors of the type with which the present invention is concerned are not truly flat but are inwardly bowed, or concave, from edge to edge to provide a trough for receiving and temporarily retaining ores or other particulate materials.

The aforementioned inwardly bowed or concave transverse contour of the upper flight of the endless belt conveyor is reflected in the contour of the bottom 4 of the sample collector 2 and the bottoms of its end members 8 and 10.

Another feature of the sample collector 2 is that it carries, atop the end member 8, a single bail or inverted loop member 16 at or closely adjacent its vertical transverse center line. On the other hand, a pair of relatively widely spaced bail or inverted loop members 18 is carried at the upper edge of the end member 10. It will be observed that with respect to the longitudinal axis of the sample collector 2 the bail 16 is so disposed on the end member 8 as to be between both of the loops 18 on the upper edge of the end member 10. This arrangement of the bails permit the filled sample collector 2 to be removed from the endless belt conveyor by a pickup device of the type that is shown and described in my aforementioned U.S. Pat. No. 3,659,460.

An essential feature of the invention is the provision at the end of the sample collector 2 which is adjacent the end member 8 with a series of variably spaced longitudinally extending flexible tongues 20 that project from the bottom 4.

The spacing between these flexible tongues 20 may be such as are provided by separating the material thereof by slits of varying width.

The immediately foregoing construction and arrangement is such that when the sample collector 2 is in position on the endless belt conveyor to receive the particulate material from overhead, the falling of the particulate material onto the rectangular tongues 20 and then into the interior of the sample collector will assist in providing a restraint against the displacement of the sample collector by the movement of the particulate material.

Extending from sides G, adjacent to end member 8, are two vertical guide tongues which serve to align the sample collector when it is used at transfer points having sidewalled chutes. These tongues can extend straight in front, or can be bowed slightly toward the center as in a canoe to aid in "threading the needle".

This tendency of the sample collector 2 to resist displacement on the endless belt conveyor in one direction or another upon leaving the above mentioned sidewall chuted transfer point is assisted by a pair of outboard members 26 which occupy the planes of the side members 6 and extend therefrom to terminate with bevelled ends 28.

It has been found that a rubberized material of the same type and thickness of the endless belt with which the sample collector 2 is to travel is ideal; and permits the use of endless belting of the particular type which has been salvaged as no longer useful for its initial function.

While I have shown and described certain specific embodiments of the present invention, it will be readily understood by those skilled in the art that I do not wish to be limited exactly thereto, since various modifications may be made without departing from the scope of the invention as defined in the appended claims.

I claim:

1. A sample collecting container for use on substantially horizontally disposed power-driven endless conveyor belts comprising, in combination,
    a substantially rectangular main body member having a pair of parallel side-walls and a pair of parallel end-walls disposed at right-angles with respect to said side-walls;
    said side-walls and said end-walls being of substantially the same height;
    said main body member being adapted for longitudinal disposition on, and movement along with, the upper flight of the endless conveyor belt for which it is intended;
    the width of said main body member being sufficient to enable it to receive the full width of a body of particulate material which is being directed onto the upper flight of the endless conveyor belt from above;
    the forward or advance end of said body member being provided with a plurality of closely spaced substantially rectangular flexible tongues which extend forwardly from the forward sides and bottom of said body member;
    the rearward or trailing end of said body member being provided with vertically disposed panels which extend rearwardly from, and in substantial alignment with respect to each of, the side-walls of said body member and for a distance which is substantially less than the length of said side-walls.

2. The sample collecting container of claim 1, together with one or more projecting loops which are attached to and extend from the forward and rearward end-walls of said body member.

3. The sample collecting container of claim 1, wherein all of the components referred to are constructed of rubber or other semi-flexible material, thereby reducing the damage to the belt installation should the sample collect or inadvertently escape from the retrieving mechanism.

* * * * *